Figure 1:
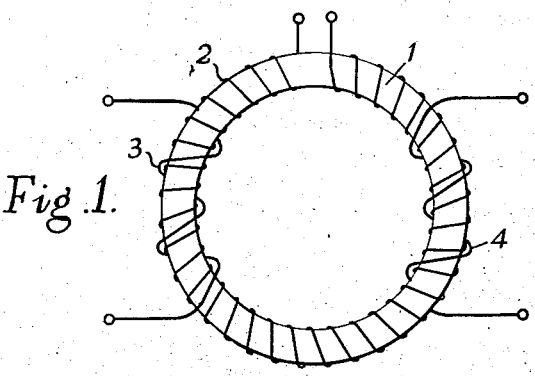

INVENTORS
P. J. A. Turner
E. H. Cardiff
BY
Moore & Hall
ATTORNEYS

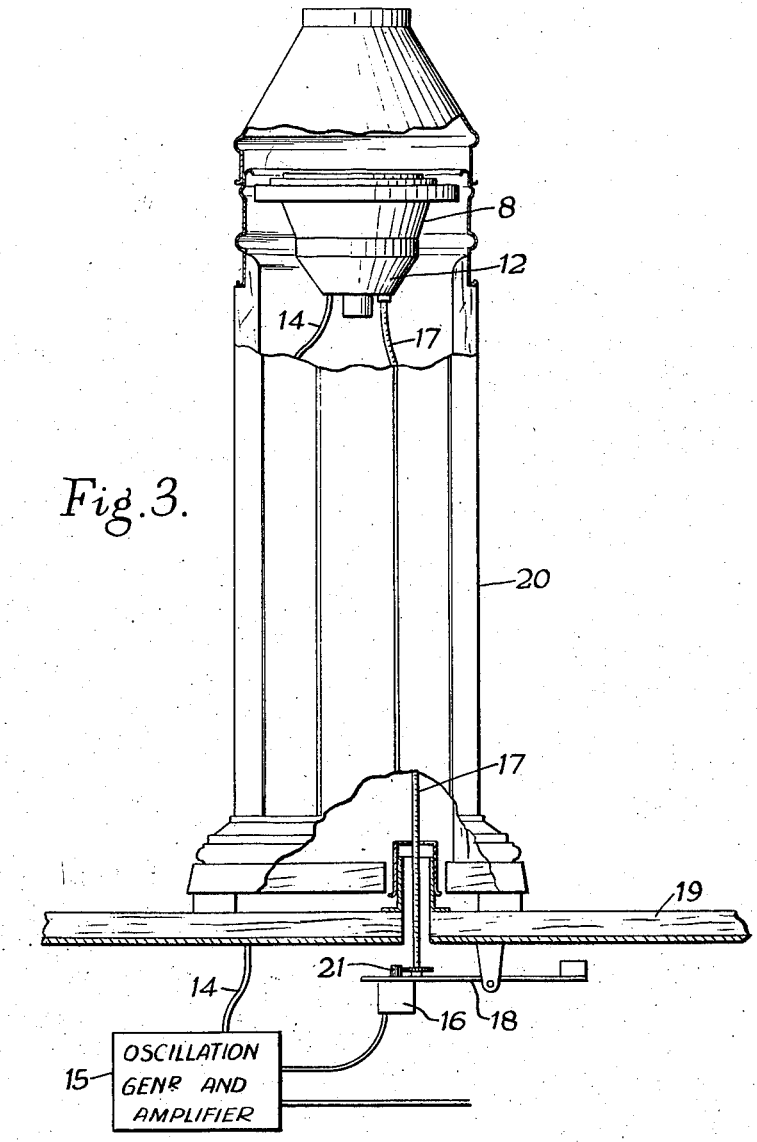

United States Patent Office 2,922,227
Patented Jan. 26, 1960

2,922,227
TRANSMITTING MAGNETIC COMPASS SYSTEMS

Peter James Aspinall Turner and Edward Hamilton Cardiff, Glasgow, Scotland, assignors to Kelvin & Hughes Limited, Glasgow, Scotland Application August 26, 1955, Serial No. 530,740

Claims priority, application Great Britain August 27, 1954

2 Claims. (Cl. 33—223)

The present invention relates to apparatus for the remote reproduction of compass indications.

It is an object of the present invention to provide a transmitting magnetic compass system for use in ships which will be capable of operating one or more repeaters in remote parts of the ship, such compass system having certain advantages over known systems as will hereinafter appear.

It is often a requirement that the primary sensing unit or master compass should be of the normal magnetic type used in a standard type of binnacle so that well known methods of adjustment for the magnetism of the ship may be employed.

Further, one at least of the repeaters should preferably be capable of delivering a considerable torque so that it can operate the erecting gear of the radar display of the ship.

The Admiralty transmitting magnetic compass fulfils these requirements, but it is complex and expensive. It is accordingly the principal object of the present invention to provide a system which is simple to operate and less expensive than the Admiralty system, and hence more suitable for use in merchant ships.

It might seem possible to use an ordinary liquid-filled compass bowl under which is mounted the sensing element of a gyro-magnetic compass as described in the specification of British Patent No. 586,506 in order to detect the local fields due to the compass magnet. However, it is found that the field of the sensing unit itself prevents the use of this arrangement since it has an attraction for the magnet and produces an error in the compass reading.

A further possibility considered was the use of a ring type element fitting under the compass bowl to detect the field of the compass magnet. Such a ring may be brought near to the compass without causing deflection if the axis of the ring coincides with that of the compass and the ring is without a preferred axis of magnetisation, whereby when operating conditions exist such that the flux guide is not moved to follow the compass magnet and magnetism is induced in the flux guide by the field of the compass magnet attracting the compass magnet to the flux guide, any resultant inaccuracy of compass reading is eliminated by the symmetrical toroidal form of the induced field of the flux guide with respect to the compass magnet. The ring consisted of a mu-metal core with a complete toroidal primary winding energised with 400 cycles A.C., and two or four equally-spaced secondary windings. The outpost from these latter was fed into a sine-cosine potentiometer and the error signal obtained was amplified to drive a motor and thereby to turn the potentiometer to a null point. This arrangement, however, was found to introduce difficulties due to the need for extreme accuracy in the detector ring and its windings.

It was found, however, that this need for a high degree of uniformity in the ring could be obviated by making the ring work at its own null point by following the compass magnet, so that the same portion of the ring was in line with the magnetic field of the compass magnet at all times.

A transmitting magnetic compass system according to the present invention, therefore, comprises a magnetic compass, a ring of magnetic material located in the field of the compass magnet and rotatable relatively to the compass housing about an axis fixed in relation to the compass pivot and passing substantially through the compass pivot, means, including windings upon said ring, for generating a voltage dependent upon changes in the angular position of the ring about its axis relatively to the said field, means for applying the said voltage to drive the ring in such a manner that its angular position in relation to the field tends to remain substantially constant, and means adapted to transmit the movements of the ring relatively to the compass housing to one or more remote points.

Figure 2:
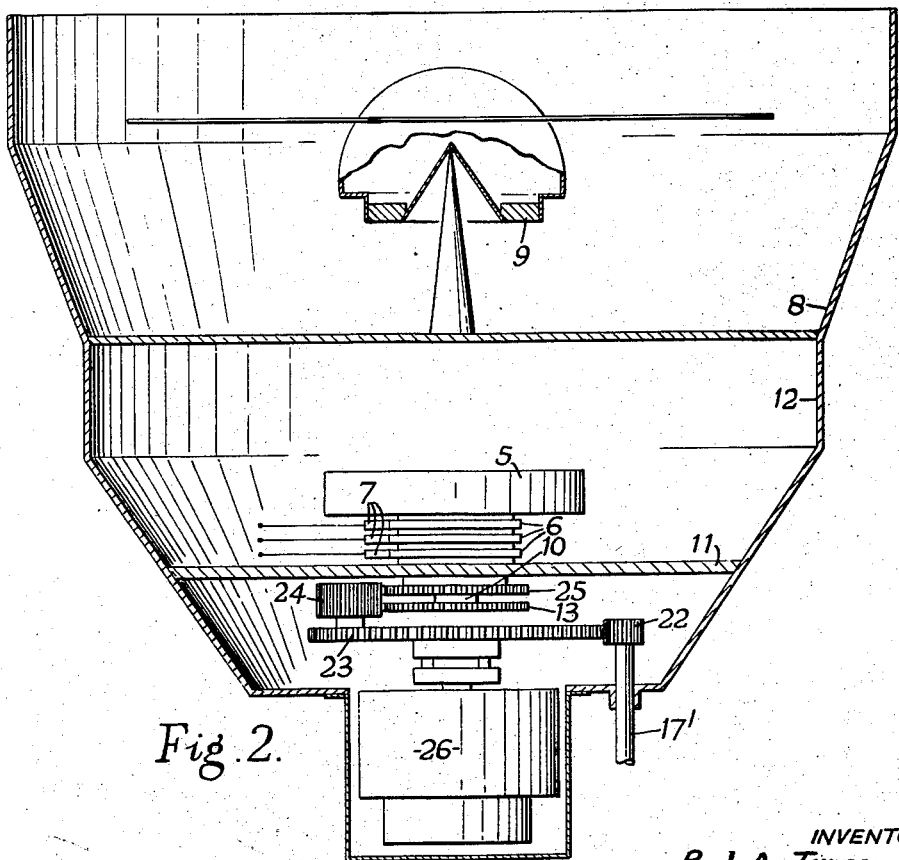

One embodiment of the invention will be described by way of example with reference to the accompanying drawings in which:

Fig. 1 is a plan view of the main parts of a detector unit, comprising a detector ring and its windings, Fig. 2 is a view, partly in section, of a binnacle carrying the transmitting compass, and Fig. 3 is a partly diagrammatic representation of the transmitting compass installation.

Referring to the drawings, and first to Fig. 1, a detector ring 1 consists of one or more laminations of mu-metal and is about three inches in diameter and of rectangular cross-section about 0.02 by 0.04 inch, having the larger dimenison in the horizontal plane. The ring 1 is annealed so as to be magnetically "soft" and is provided with a primary winding 2 wound toroidally and uniformly around the ring, and which is fed, in operation, with alternating current at say 800 c.p.s. Two secondary windings 3, 4 are made on top of the primary winding 1 in the form of closely-bunched coils symmetrically arranged at the ends of a diameter of the ring.

In Fig. 2 the detector unit of Fig. 1 is shown at 5, the coils 2, 3, 4 thereof being connected to slip rings 6 engaged by brushes 7. A compass bowl 8 of the usual marine type has a pivoted directional system including a magnet 9 which aligns itself with the horizontal component of the earth's magnetic field. The detector unit comprising the parts 5, shown in detail in Fig. 1, together with the slip rings 6 is fixed to a spindle 10 which is rotatably mounted in a platform 11 in a casing 12 fixed to the bottom of the bowl 8. The axis of the spindle 10 is arranged to pass through the pivot of the compass magnet 9. The spindle 10 carries a toothed wheel 13 by which the detector unit 5 is rotated, in a manner to be described later, in order to maintain a substantially fixed angular relation between this unit and the compass magnet 9.

The two secondary windings 3 and 4 of the detector unit are connected in series and through two of the brushes 7 co-operating with two of the slip rings 6 and through a connecting cable 14 to the input of a phase sensitive amplifier and oscillation generator 15, shown in Fig. 3. Oscillations, for example at a frequency of 800 c.p.s., are applied from 15 through the cable 14 and through another brush 7 and slip ring 6 to the primary winding 2 of the detector unit.

The arrangement of the windings 2, 3 and 4 is such that when, in operation, the two secondary windings 3, 4 are symmetrically disposed with respect to the field of the magnet 9, no signal will be generated in the secondary windings 3, 4 and the detector unit 5 will be in what will hereinafter be referred to as the "null" position.

If the detector unit 5 moves away from this symmetrical position a signal of twice the frequency of the current in the primary winding 2, namely in this example 1600 c.p.s., is generated in the combined secondary windings 3 and 4 due to the asymmetry produced in the saturating flux generated by the alternating current, this asymmetry bearing a phase relationship to the alternating current which depends on the direction of asymmetry of the secondary windings 3 and 4 in the magnetic field.

The derived signal of 1600 c.p.s. is fed into the amplifier 15 of which the output stage is provided with phase discriminating ability by means of a bias voltage of 1600 c.p.s. applied thereto. Its output thus consists of unidirectional current, whose magnitude and sense depend on the magnitude and sense of the phase difference between the signal and the bias. The output current is fed to a D.C. motor 16 so arranged as to drive the detector unit towards the "null" position.

The parts of the apparatus near to the compass bowl 8, excepting the ring 1, are made of non-magnetic material so that their presence does not distort the magnetic field of the magnet 9. The motor 16 is located remote from the compass bowl 8 in order to prevent it from influencing the magnetic field of the compass, and is provided with a flexible drive 17 of known design but of non-magnetic material. The motor 16 and gearing 21 between it and the flexible drive 17 are mounted on a platform 18 pivotally mounted beneath the deck 19 supporting a binnacle 20 which carries the compass bowl 8 in gimbals (not shown). The platform 18 is pivoted in order to permit the motor 16 to follow the movements of the compass bowl 8 in its gimbals.

The flexibility of the shaft 17 is no disadvantage to the accuracy of the system since the position of the detector unit 5 itself controls the generation of an error signal, and, accordingly, the motor 16 will continue to drive until the "null" position of the detector unit 5 is reached.

The effect of any twist of the flexible drive 17 is reduced by the provision of reduction gearing between the flexible shaft 17 and the detector unit spindle 10 which is made such that one revolution of the detector unit 5 corresponds to 90 revolutions of the flexible shaft 17.

As shown in Fig. 2 this reduction gearing comprises a pinion 22 mounted on the end 17' of the flexible drive and meshing with a gear wheel 23 carrying a planet pinion 24 which meshes with two gear wheels 13 and 25, the former being, as already described, fixed on the spindle 10 of the detector unit 5. The gear wheel 25 is fixed to the platform 11. The gear wheel 25 is provided with 91 teeth and the gear wheel 13 is provided with 90 teeth. It follows that for each revolution of the planet wheel 24 round the fixed gear wheel 25, the gear wheel 13 is rotated by one tooth pitch. Hence 90 revolutions of the gear wheel 23 are equivalent to one revolution of the detector unit 5. The gear wheel 23 is connected to a transmitter 26, which is an Admiralty M-type step-by-step transmitter, which is adapted to provide the required accuracy of transmission when driven at 90 revolutions for each revolution of the detector unit 5. However, the power available from the arrangement described can be arranged to be sufficient to drive any other known transmitter. The M-type transmitter, which is a rotary switch, is particularly suitable and, since it can be made of non-magnetic materials and have its wiring so arranged as to avoid electromagnetic effects, it can be mounted in close proximity to the detector unit 5.

In effect, with the system of the present invention, the detector unit 5 follows the movements of the pivoted magnetic compass card, although in actual fact, of course, the card remains stationary and the binnacle moves. By transmitting the movements of the detector unit 5 relatively to the binnacle 20 to desired remote points, the compass movements can be reproduced at such points.

We claim:

1. A transmitting magnetic compass system comprising a magnetic compass, a flux guide comprising a ring of magnetic material having a symmetrical toroidal magnetic field pattern located in the field of the compass magnet and rotatable relatively to the compass housing about an axis fixed in relation to the compass pivot and passing substantially through the compass pivot, means, comprising windings upon said ring, for generating a voltage dependent upon changes in the angular position of the ring about its axis relatively to the said field, means for applying the said voltage to drive the ring in such a manner that its angular position in relation to the field tends to remain substantially constant, and means adapted to transmit the movements of the ring relatively to the compass housing to one or more remote points, whereby when operating conditions exist such that the flux guide is not moved to follow the compass magnet and magnetism is induced in the flux guide by the field of the compass magnet attracting the compass magnet to the flux guide, any resultant inaccuracy of compass reading is eliminated by the symmetrical toroidal form of the induced field of the flux guide with respect to the compass magnet.

2. A transmitting magnetic compass system according to claim 1, wherein the windings upon the ring of magnetic material comprise a primary winding wound toroidally and uniformly around the ring and two secondary windings in the form of closely-bunched coils symmetrically arranged at the ends of a diameter of the ring.

References Cited in the file of this patent

UNITED STATES PATENTS

| | | |
|---|---|---|
| 579,166 | Heinrich et al. | Jan. 11, 1898 |
| 2,008,481 | Weber et al. | July 16, 1935 |
| 2,308,566 | Noxon | Jan. 19, 1943 |
| 2,389,146 | Fragola | Nov. 20, 1945 |

FOREIGN PATENTS

| | | |
|---|---|---|
| 239,085 | Great Britain | Sept. 3, 1925 |
| 250,946 | Great Britain | 1927 |